(12) United States Patent
Crooks et al.

(10) Patent No.: US 11,494,750 B2
(45) Date of Patent: Nov. 8, 2022

(54) NOT-ON-FILE IMAGING SYSTEM AND PROCESSING

(71) Applicant: NCR Corporation, Duluth, GA (US)

(72) Inventors: John Crooks, Duluth, GA (US); Michael Keith Reed, Buford, GA (US)

(73) Assignee: NCR Corporation, Atlanta, GA (US)

( * ) Notice: Subject to any disclaimer, the term of this patent is extended or adjusted under 35 U.S.C. 154(b) by 72 days.

(21) Appl. No.: 15/474,600

(22) Filed: Mar. 30, 2017

(65) Prior Publication Data
US 2018/0285848 A1    Oct. 4, 2018

(51) Int. Cl.
*G06Q 20/20* (2012.01)

(52) U.S. Cl.
CPC ......... *G06Q 20/201* (2013.01); *G06Q 20/202* (2013.01); *G06Q 20/208* (2013.01)

(58) Field of Classification Search
CPC ... G06Q 20/201; G06Q 20/202; G06Q 20/208
USPC .......................................................... 705/20
See application file for complete search history.

(56) References Cited

U.S. PATENT DOCUMENTS

| | | | | |
|---|---|---|---|---|
| 5,162,639 A * | 11/1992 | Sugiyama | ............... | G07G 1/145 235/383 |
| 5,494,136 A * | 2/1996 | Humble | ................... | A47F 9/047 186/61 |
| 5,978,772 A * | 11/1999 | Mold | ...................... | A47F 9/046 186/61 |
| 5,988,498 A * | 11/1999 | Hoell | ..................... | G07G 1/145 235/377 |
| 6,318,631 B1 * | 11/2001 | Halperin | .............. | G06K 7/0004 235/383 |
| 6,510,989 B1 * | 1/2003 | Ortega | .................. | G06Q 20/203 235/383 |
| 6,959,286 B2 * | 10/2005 | Perkowski | ............. | G06Q 30/02 705/26.62 |
| 9,082,146 B1 * | 7/2015 | Lavingia | ............ | G06Q 30/0623 |
| 2002/0194074 A1 * | 12/2002 | Jacobs | ..................... | G07G 1/01 705/16 |
| 2012/0158482 A1 * | 6/2012 | Paradise | ............ | G06Q 30/0224 705/14.25 |
| 2012/0205433 A1 * | 8/2012 | Dudek | ................. | G06Q 20/209 235/375 |

(Continued)

*Primary Examiner* — Florian M Zeender
*Assistant Examiner* — Nicole Elena Bruner
(74) *Attorney, Agent, or Firm* — Schwegman, Lundberg & Woessner (57) ABSTRACT

Various embodiments herein each include at least one of systems, methods, software, and data structures for product identifier not-on-file imaging system and processing. Some such embodiments include solutions that automate capturing and communicating images of imaged items for which an item identifier (e.g., UPC, DIGIMARC) cannot be located to facilitate correction and updating of product lookup databases to remove inefficiencies and sub-optimal experiences and realization at checkout. One such embodiment in the form of a method includes delivering, to a product pricing update location, an image of an item presented to a product scanner for scanning upon an occurrence of an item-not-on-file event indicating an unsuccessful price lookup database query performed with regard to an item identifier read by the product scanner from the presented item.

4 Claims, 7 Drawing Sheets

(56) References Cited

U.S. PATENT DOCUMENTS

| | | | |
|---|---|---|---|
| 2013/0332291 A1* | 12/2013 | Perez | G06Q 30/0623 705/14.73 |
| 2014/0143039 A1* | 5/2014 | Branton | G06Q 30/0223 705/14.24 |
| 2014/0232874 A1* | 8/2014 | Meyer | H04N 7/181 348/159 |
| 2015/0127490 A1* | 5/2015 | Puertas | G06Q 30/0625 705/26.62 |
| 2015/0186862 A1* | 7/2015 | Itani | G07G 1/0036 705/23 |
| 2015/0242833 A1* | 8/2015 | Itani | G07G 1/01 705/23 |
| 2015/0339650 A1* | 11/2015 | Moro | G06Q 20/208 705/23 |
| 2017/0177969 A1* | 6/2017 | Zaremski | G06K 9/00771 |
| 2018/0247298 A1* | 8/2018 | Khan | G06Q 20/20 |

* cited by examiner

NOT-ON-FILE IMAGING SYSTEM AND PROCESSING

BACKGROUND INFORMATION

Item-not-on-file is a continuous issue at stores when scanning products at checkout with product scanners. An item-not-on-file event occurs when an item identifier is scanned, such as from a Universal Product Code (UPC), and is used unsuccessfully to find a price of the item in a price lookup database. When this occurs, a manual price lookup is commonly performed where a store associate goes to the location of the product in the store to get the listed item price. This can be time consuming and can delay not only the current customer but also all other customers that may be in line to checkout. In an effort to save time, a clerk may simply input a price, but if that price is wrong, the customer may be over or under charged, neither of which is optimal. At the same time however, the next time the same product is presented for purchase by the same or another customer, the same price lookup will fail and trigger another lengthy, inefficient process or incur more shrinkage for the store if a low price is input or customer overpayment will occur if the input price is too high. Current processing of item-not-on-file event occurrences is there for inefficient at best and certainly not optimal when prices that are either too low or too high are input.

SUMMARY

Various embodiments herein each include at least one of systems, methods, software, and data structures for product identifier not-on-file imaging system and processing. Some such embodiments include solutions that automate capturing and communicating images of imaged items for which an item identifier (e.g., UPC, DIGIMARC) cannot be located to facilitate correction and updating of product lookup databases to remove inefficiencies and sub-optimal experiences and realization at checkout.

One such embodiment in the form of a method includes delivering, to a product pricing update location, an image of an item presented to a product scanner for scanning upon an occurrence of an item-not-on-file event indicating an unsuccessful price lookup database query performed with regard to an item identifier read by the product scanner from the presented item.

Another method embodiment includes detecting an item-not-on-file event for an item presented for scanning and transmitting, via a network to a network location for further action, an image of the item presented for scanning and an item identifier read from the presented item.

A further embodiment, in the form of a product scanner, includes at least one imaging device, an interface device, a processor, and a memory device. In such embodiments, the memory stores instructions executable on the processor to perform data processing activities. In some embodiments, the data processing activities include processing an image captured by the at least one imaging device to locate and read an item identifier encoded in an indicia included in the image and performing an item lookup within a price lookup database based on the item identifier. The data processing activities may further include detecting an item-not-on-file event when the item identifier is not present in the price lookup database and transmitting, via the interface to a network location for further action, the image and the item identifier.

DETAILED DESCRIPTION

"Item not-on-file" event occurrences at checkout are a constant headache for both shoppers and retailers. An "item not-on-file" event occurs when a retail item is scanned, but the point-of-sale (POS) terminal does not know the item price, because the item's identifier (e.g., UPC, DIGIMARC, etc.) is not on file in the retailer's price lookup (PLU) database.

A somewhat typical situation where this may occur is when a cashier scans an item during checkout. The product scanner may then make a "honk" sound or provide other indicia indicating the item is not in the store's PLU database. The cashier then calls for another store associate to run a price check, which means the associate scurries through the store to find the item and get the price advertised or shown in the store. The store associate then provides the price to the cashier and the cashier manually enters the price into the POS terminal. With luck, the associate who ran the price check remembers to bring back an extra of the item. The associate then leaves the item on the store price manager's desk with a note to fix the problem. The price manager is the person at the store responsible for maintaining the store's PLU database.

Item not-on-file events reduce checkout efficiency and annoy customers. Such events can also lead to shrinkage issues when the cashier chooses to give the item away or at a low price rather than inconvenience the customer with a price check.

The various embodiments herein include solutions that leverage imaging capabilities of modern product scanners, such as the 7877 and 7879 product scanners available from NCR Corporation of Duluth, Ga. Some such embodiments are in the forms of systems and methods for capturing images of not-on-file items in assisted or self-checkout lanes. Some such solutions store these images and automatically deliver them to store personnel for later action. These solutions may include optional features to bind the images with barcode metadata, such as a product identifier, to automatically dispatch a store associate for an immediate price check, and to cache previous price check results for re-use when the item is presented at a later time.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
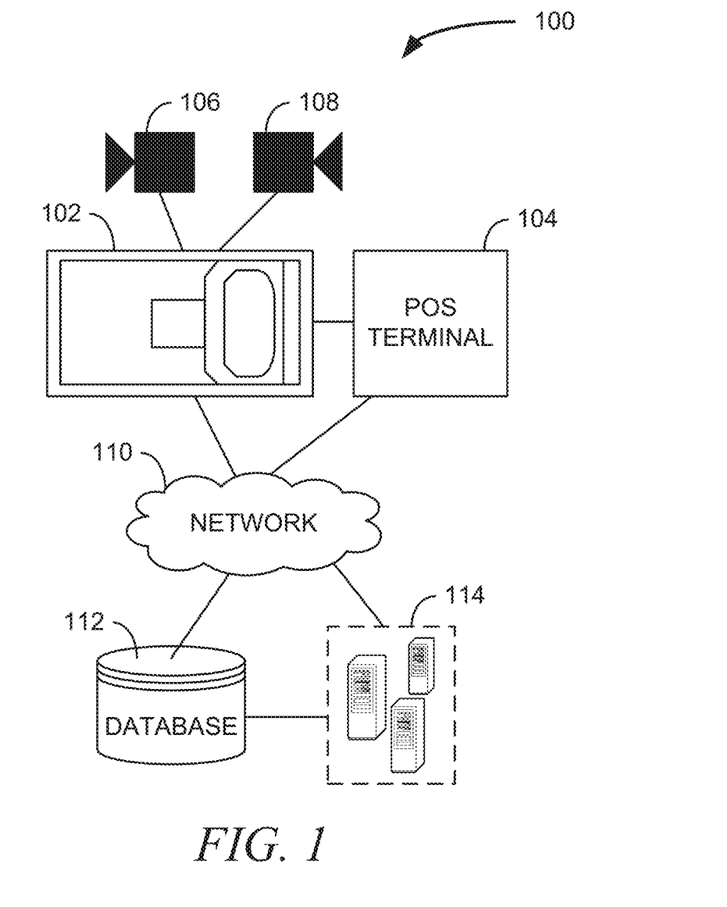
FIG. 1 is a logical block diagram of a system 100 including a scanner, according to an example embodiment.

FIG. 1 is a logical block diagram of a system 100 including a scanner, according to an example embodiment. The system 100 is an example of deployment in a retail environment, although the various embodiments herein are also applicable to other environments, such as customer service kiosks and library checkouts, travel check-in kiosks, among others.

The system 100 includes a scanner 102 coupled to a terminal 104. The term product scanner is also used herein and is synonymous with the term scanner, as in scanner 102. The scanner 102 may be a product scanner or similar scanning device in some embodiments. An example of such a scanner is the REALSCAN 7879 BI-OPTIC IMAGER available from NCR Corporation of Duluth, Ga. Such modern scanners utilize one or more cameras in performing their scanning functions. Some such scanners even have four or more cameras included therein. Additional cameras may also be coupled to or otherwise be in communication with the scanner 102 or the terminal 104, such as a camera that may be mounted on a pole on the ceiling to provide an overhead view of one or both of the terminal 104 and scanner 102 areas. As such, these cameras may be utilized to capture images of many things including items presented for scanning or weighing, an area around the terminal, a cashier at the terminal 104 or a neighboring terminal, customers at the terminal 104 or in line, and other areas.

The terminal 104 may be a modern cash register serviced by a checkout clerk or cashier, or it can be a self-checkout terminal or other Self-Service Terminal (SST), customer service kiosk, and the like. In some embodiments, the scanner 102 is coupled, via either wired or wireless connections, to one or more additional cameras, such as cameras 106, 108. However, various embodiments may include one camera, three, four, and even more cameras. In some embodiments, the camera 106 may be pointed in the direction of a customer presenting items to purchase and documents to complete a purchase transaction at the terminal 104. Similarly, the camera 108 may be pointed in the direction of a terminal 104 clerk. Other cameras, such as cameras integrated within the scanner 102 may be directed toward a scan field of the scanner 102 to capture images of barcodes, watermarks embedded within product packaging (e.g., DIGIMARC), and the environment around the scanner 102 and terminal 104.

The system 100 also typically includes a network 110 that connects one or both of the scanner 102 and the terminal 104 to other computing devices. The other computing devices may include one or more transaction processing systems 114, one or more databases 112 that may store transaction, product, product pricing, and other related data, depending on the particular embodiment. The network 110 may also provide a connection to a security video-over-Ethernet storage, viewing, and monitoring system that receives images and video from the cameras 106, 108 and the scanner 102 cameras deployed at the terminal 104.

Figure 2:
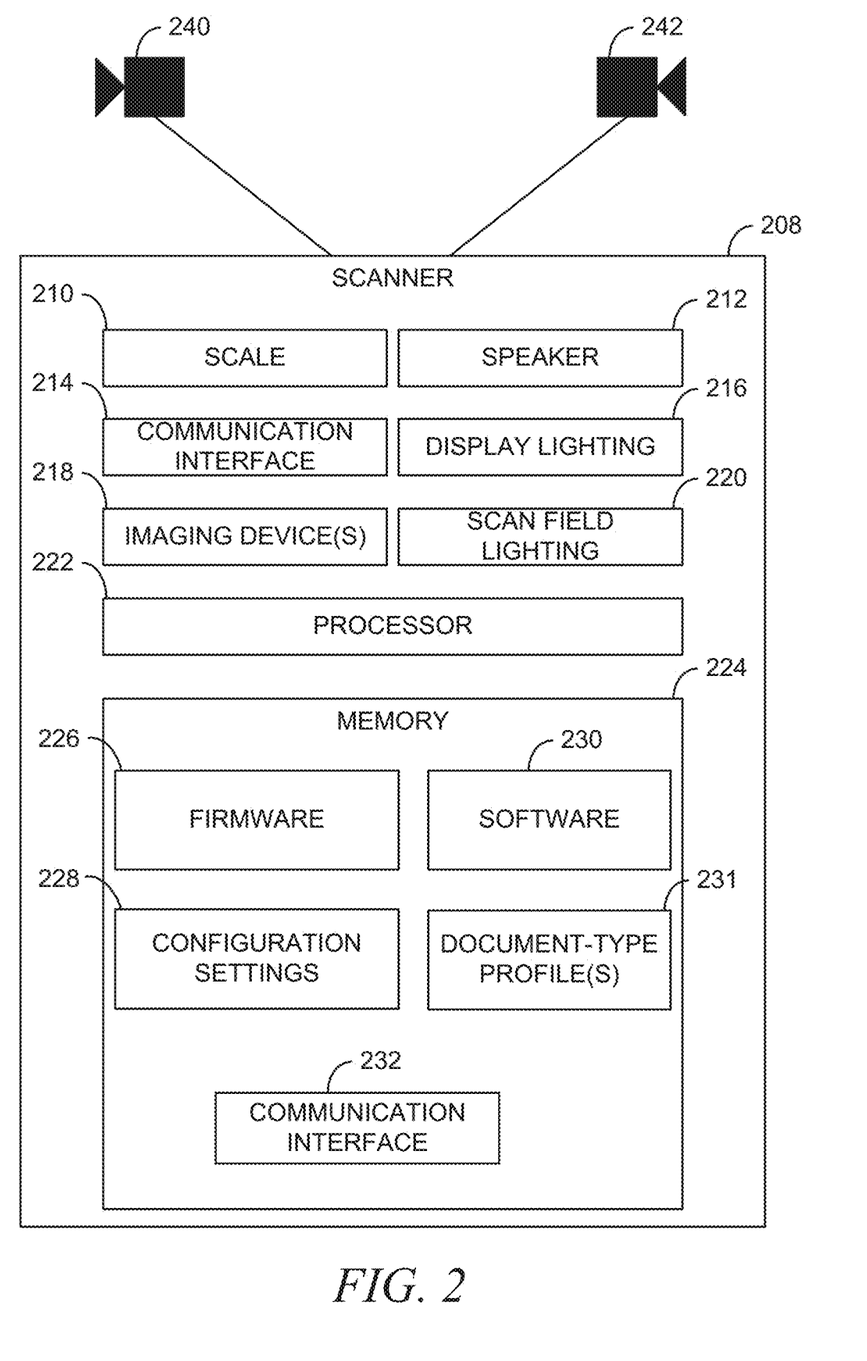
FIG. 2 is a diagram illustrating components of a scanner 208 that may be deployed at a checkout station such as a POS terminal, self-service terminal (SST), or other kiosk system including a scanner 208, according to an example embodiment.

FIG. 2 is a diagram illustrating components of a scanner 208 that may be deployed at a checkout station such as a POS terminal, self-service terminal (SST), or other kiosk system including a scanner 208, according to an example embodiment. It is to be noted that the scanner 208 is shown schematically in greatly simplified form, with example components relevant to understanding various embodiments herein. Note that the scanner 208 may include more or fewer components in some embodiments.

Furthermore, the various components included in the FIG. 2 as illustrated and arranged are provided for illustration purposes only. It is to be noted that other arrangements with more or fewer components are possible without departing from the contributions herein.

Moreover, the methods and scanner 208 presented herein and below may include all or some combination of the components described and shown in the various contexts herein. Further, although the scanner 208 may be paired with a POS terminal, the scanner 208 may be a standalone element or an element of other systems, devices, and terminals in other embodiments. Examples of other terminal-types that may include a scanner 208 are SSTs, clerk operated and self-service library checkout stations, timekeeping terminals, and the like. Additionally, although a scanner 208 is illustrated in FIG. 2 according to some embodiments, the non-on-file imaging processing and methods described herein may also be implemented with regard to images and video streams generated by one or more other devices, such as stand-alone cameras, such as one or more of cameras 240, 242 that may be coupled either directly or indirectly via USB or a network to the scanner 208.

The methods of some embodiments are programmed as executable instructions in memory and/or non-transitory computer-readable storage media and executed on one or more processors associated with the components and devices herein. For example, some embodiments may be deployed as firmware present within the scanner 208, such as firmware 226. In other embodiments, the in-scanner image sorting and processing functions may be deployed as software 230 stored in memory 224 on the scanner 208 or network deployed service accessible by the scanner. The memory 224 may also store a PLU database that may be a replica of all or a portion of a PLU stored on a network accessible storage device. In other embodiments, the not-on-file imaging processing and methods described herein may be performed on a computer controlling a POS terminal to which the scanner 208 is coupled, on a network server, or on a combination of two or more of the scanner 208, the computer controlling the POS terminal to which the scanner 208 is coupled, and elsewhere.

The scanner 208 may be referred to herein as a product scanner or barcode scanner as that is the task most commonly associated with such devices. During operation, items are placed within a scan field of the scanner 208. One or more imaging devices 218 of the scanner 208, such as one or more cameras, then scan a barcode and information read therefrom is communicated to a POS system. The scanning may include capturing an image with one or more of the imaging device(s) 218 and the cameras 240, 242 and then processing the image(s) to locate and decode an indicia of an item identifier. The POS system then uses that data to identify the item placed within the scan field of the scanner 208, performs a price lookup in a PLU database and sometimes an additional function, such as an addition of the item to a list of items to be purchased, which may be presented on the one or more POS displays. The additional function may also include identifying a scanned product as a controlled item for which an age, identity, and/or address validation must be performed. A message may be presented on the one or more POS displays and a message may also be sent to the scanner 208 indicating an identification card or other document is to be scanned. Other additional functions may also be performed in different embodiments.

Of particular note, the additional function may be selected based on a result of the price lookup. For example, when the price look up is not successful, a not-on-file event occurs and triggers a process in some embodiments to store the image or instruct the user to present the item again so a new image can be captured and stored. That stored image may then be communicated to one or more of a store associate to go find a price of the product in the store, store a copy of the image and the product identifier to a network storage location for later use by a pricing manager to update the PLU database, and other functions as described elsewhere herein. When a price is received back at the POS terminal, the price may be input there or received over a network, such as from a mobile device of the store associate that went to find the price. That price may then be cached or stored by the PLU database that may be local to the scanner and POS terminal, and may even be transmitted over the network to a master PLU database, but marked as temporary and in need of attention by the pricing manager. Regardless, the general concept in some embodiments is to capture at least an image and item identifier of the presented item for which the not-on-file event occurred and automate the storage or dissemination of that information to enable a pricing manager or other personnel to update the PUT database.

The scanner 208 may include one or more scan fields, such as two scan fields of bi-optic scanners that are commonly seen in grocery and discount retail outlets. In addition to the imaging devices 218, the scanner 208 may include various other components. The various other components may include an integrated scale 210 such as may be used in a grocery outlet to weigh produce and one or both of a speaker 212 and display lighting 216 to output audio and visual signals such as signals of (un)successful scans. The scanner 208 may also include scan field lighting 220 that may be turned on and off and adjusted based on a detected presence of an item to be scanned. The scan field lighting 220 may include one, two, or more different light colors, such as white, red, green, infrared, and possibly others. Additionally, scan field lighting 220 may be of variable intensity or brightness in some embodiments and be varied by applying different electric potentials to the lighting elements or adjusting a number of lighting elements, such as LEDs that are illuminated.

During typical operation, the scanner 208 is operated according to instructions executed on a processor 222. The processor 222 may be an application specific integrated circuit (ASIC), digital signal processor, microprocessor, or other type of processor. The instructions may be firmware 226 or software 230 stored in one or more memories 224. The one or more memories 224 may be or include volatile and non-volatile memories, write-protected memories, write-once memories, random access memory (RAM), read only memories (ROM), secure memory, and other memory and data storage types and devices.

The instructions as may be stored in firmware 226 or as software 230 in memory 224 are executed according configuration settings stored in the memory 224. The configuration settings 228 configure operation of the scanner 208 and the various components therein. For example, the configuration settings 228 may configure speaker 212 volume, display lighting 216 outputs, and scan field lighting 220 brightness. The configuration settings may also configure decoding algorithms of the imaging device(s) 218 and the instructions, one or more communication protocols used to communicate data from the scanner 208 to a POS system or other system via wired or wireless connections, and scale 210 operating parameters (e.g., unit of measure as pounds or kilograms). The configuration settings may also configure other settings of the particular scanner 208 an embodiment may include. In some embodiments, the configuration settings 228 may include a firmware version, a software version, and the like. Thus, when a configuration is set or updated, the setting or updating of the configuration settings 228 may include population and updates of any of the configuration settings 228 of a particular embodiment, including an update to firmware and software present on the scanner.

The scanner 208 may include one or more communication interfaces 214, 232 that enable the scanner 208 to communicate via one or both of wired and wireless connections over a network and with other computing devices. In some embodiments, the communication interface 232 may provide a visualized communication connection on the scanner 208 that enables the scanner to communicate over a network leveraging network connectivity of a terminal or other computing device with which the scanner is paired, such as a POS terminal.

Figure 3:
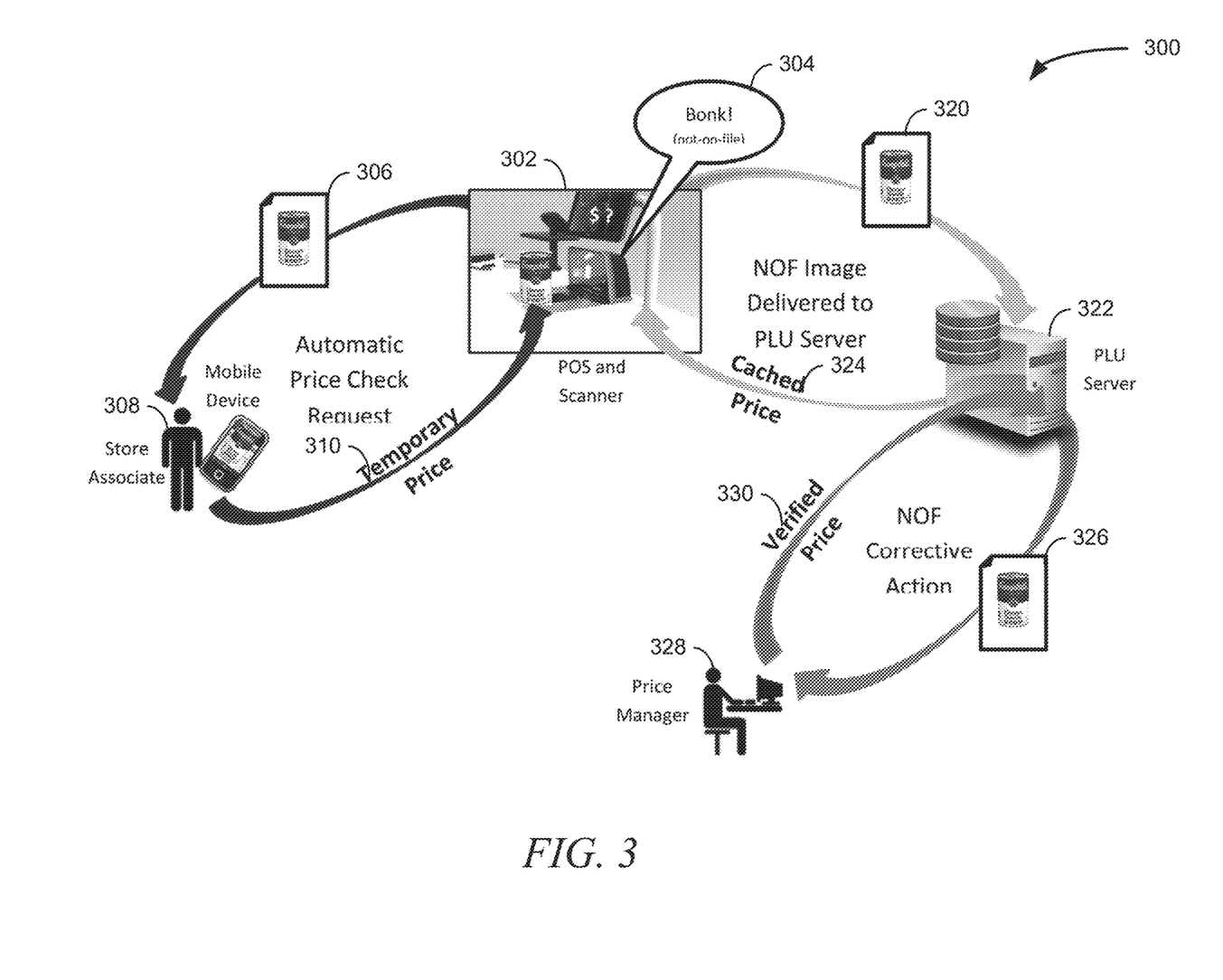
FIG. 3 is a process flow diagram, according to an example embodiment.

FIG. 3 is a process 300 flow diagram, according to an example embodiment. The process 300 is an example of a process that may be performed upon an occurrence of an NOF event occurrence at a POS terminal. The process is illustrated from a high-level perspective.

The process 300 includes a scanner of a POS terminal 302 capturing an image of a presented item, locating an indicia (e.g., barcode) of an item identifier therein, and reading the indicia to obtain the item identifier. The scanner or POS terminal perform a product lookup in a PLU database based on the item identifier. When the product lookup fails to yield a result, a NOF event occurrence is detected and the scanner issues a BONK 304, which may be an audible sound or other output from the scanner or POS terminal 304.

Following the BONK 304 the process 300 includes sending an image 306 of the item as captured by one or more imaging devices of the scanner to a store associate 308. The sending of the image 306 may also include other data, such as the item identifier. The image 306 and other data may be sent via a network to the store associate 308, such as to a mobile device carried by the store associate 308. The store associate 308 may then find the product in the store and enter pricing data into the mobile device which is then transmitted back to the scanner or POS terminal 302 as a temporary price 310. Upon receipt by either the scanner or POS terminal 302, the temporary price data may be used in the current transaction for the item, cached thereon for subsequent use with regard to the item, and the image and additional data 320, such as the item identifier and price data, may be sent to a PLU server 322. The PLU server 322 maintains the PLU database which may be replicated and cashed 324 in whole or in part by the scanner or POS terminal 302. The PLU sever 322 upon receipt of the image and additional data 322 may provide 326 it to a price manager 328 of the store. The price manager 328 may accept the price as provided by the store associate 308 or update the price. The verified or corrected price 330 may then be sent back to the PLU server 322 which may then update the cached 324 PLU database data with regard to the item.

Figure 4:
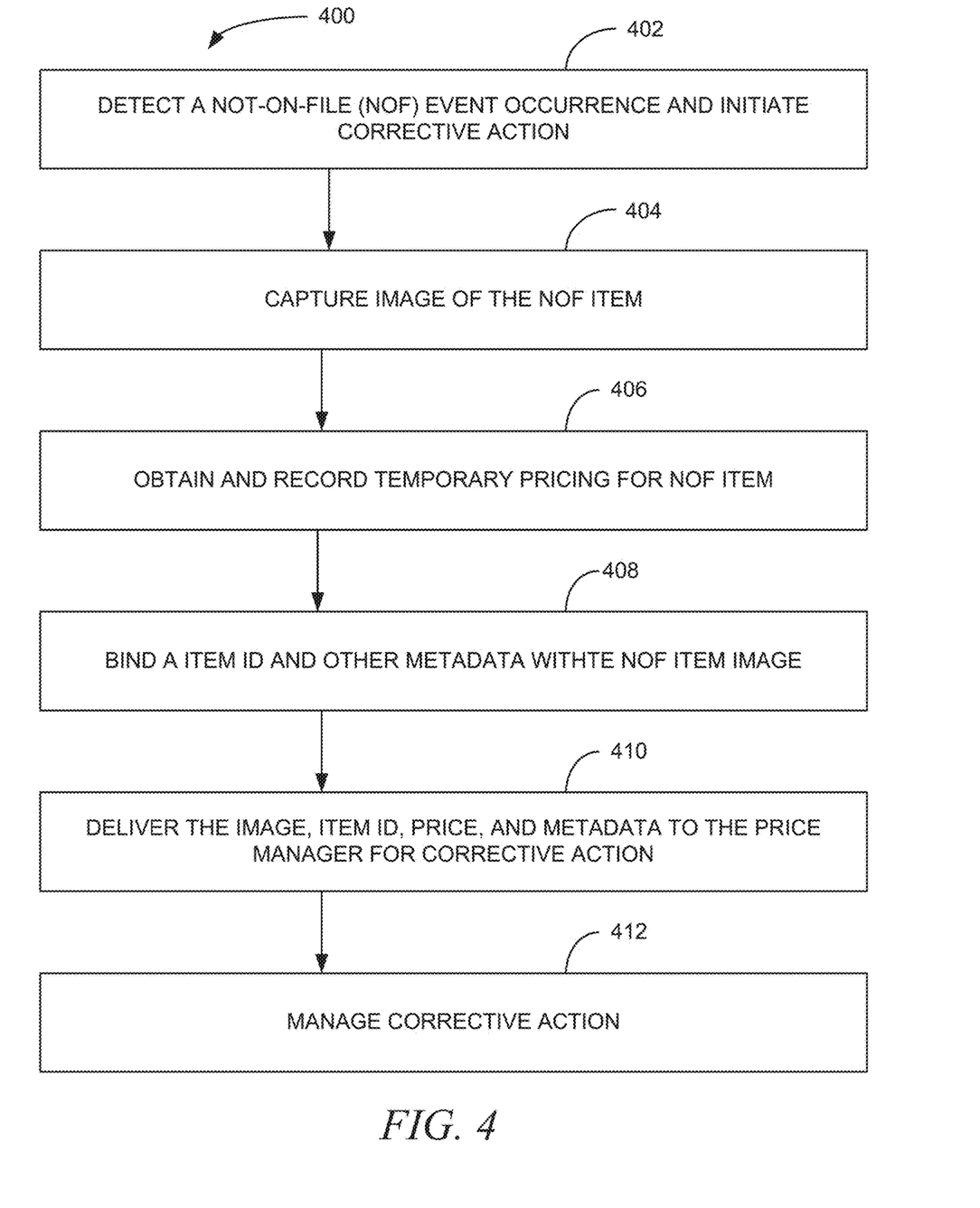
FIG. 4 is a block flow diagram of a method, according to an example embodiment.

FIG. 4 is a block flow diagram of a method 400, according to an example embodiment. The method 400 is a method that may be performed in whole or in part by one or both of a scanner and a POS terminal, among other devices.

The method 400 includes detecting 402 a NOF event occurrence and initiating corrective action. The corrective action may include capturing 404 images of the NOF item. The images may be captured 404 actively by prompting the user via one or more of a visible and audio prompt to place the product within a scan-field of the scanner. A live view of the scan-field may be presented on a POS terminal display to assist the user. The user may then initiate capturing 404 of the image or the POS terminal or scanner may determine when an image of suitable quality is ready to be captured. The images may also or alternatively be captured passively by using an image from which the item identifier giving rise to the NOF event occurrence was read. In some embodiments, one or more images that are to be used as the captured 404 image(s) are first presented to the user on a display of the POS terminal to allow the user to approve the image(s).

The method 400 may further include obtaining 406 and recording temporary pricing for the not-on-file item, which may also include utilizing a previously cached temporary price if available. However, the obtaining 406 of the temporary pricing data typically includes, at least once to establish a temporary price, a manual price check request and a manual inputting of the price into the POS terminal or an automated price gathering process. An automated price gather process may include automatically transmitting the captured 404 image of item giving rise to the NOF event occurrence to a store associate's smart device and subsequently receiving a price as input by the store associate to use as the temporary price.

The method 400 may then include an optional data processing activity of binding 408 the PLU number and other metadata with the not-on-file image(s) for security and later reference purposes. This binding 408 may include embedding one or more of the product identifier, temporary pricing data, and possibly other data in a data structure of the captured 404 image as metadata or otherwise including the data when the captured 404 image is provided to another process. The captured 404 image is then delivered 410, typically with the PLU number, price, and metadata to a price manager for corrective action. The delivery 410 may be made as a live notification via one or more of email, text, in-app mobile device messaging, or similarly. Alternatively, or in addition, the delivery may be made in whole or in part by storing the captured 404 image and other data in a NOF database or other storage location on a PLU server or other network accessible storage location. The PLU server may subsequently use the price data as a temporary price for the item until a pricing manager updates the pricing data or until a period for use of the price expires, such as 24 hours, a week, or other period.

Some embodiments of the method 400 further include managing 412 corrective actions in one or more ways. One way of managing 412 the corrective actions is by the price manager using an existing, non-integrated corrective action system. Another way of managing 412 the correction actions is with the price manager reviewing the NOF image database and using integrated software tools to correct the PLU database.

In some embodiments of the method 400, the PLU server maintains a cache of previous NOF PLU events. If the NOF PLU is in the cache and meets pre-defined criteria (for example, the price was manually checked within the last 24 hours), then the PLU server may provide the cached price to the POS. The POS may then prompt the cashier in some such embodiments to verify with the customer that the cached price is acceptable. If the customer accepts the cached price, then the cached price may be used to continue with the transaction, and does not initiate other corrective action.

Figure 5:
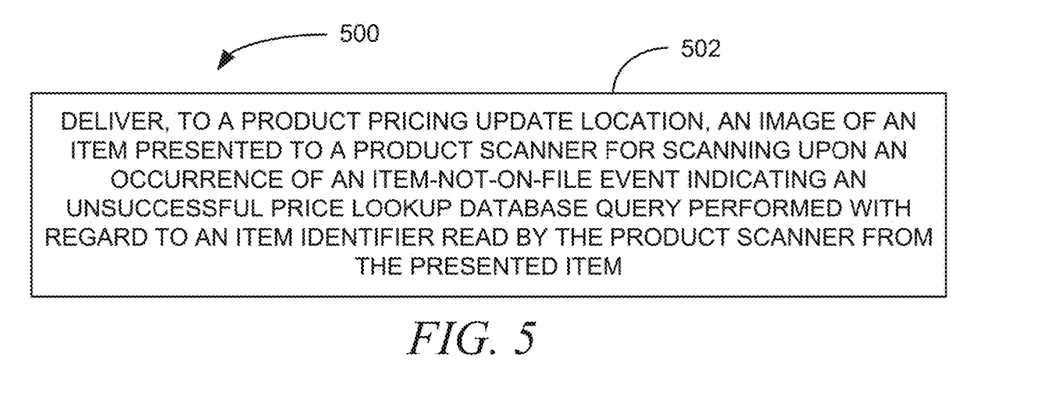
FIG. 5 is a block flow diagram of a method, according to an example embodiment.

FIG. 5 is a block flow diagram of a method 500, according to an example embodiment. The method 500 is a method that may be performed in whole or in part by one or both of a scanner and a POS terminal, among other devices.

The method 500 includes delivering 502, to a product pricing update location, an image of an item presented to a product scanner for scanning. The image may be delivered 502 upon an occurrence of an item-not-on-file event indicating an unsuccessful PLU database query performed with regard to an item identifier read by the product scanner from the presented item. In some embodiments, the pricing update location to which the image is delivered 502 is a networked data storage location to which images of items for which pricing data is to be reviewed in the price lookup database. In other embodiments, the pricing update location is an electronic messaging account that provides live notification of item-not-on-file event occurrences.

In some embodiments, the method 500 further includes receiving an input price of the presented item and updating the PLU database. The PLU database may be updated with the item identifier read by the product scanner from the presented item and the received input price with a designation as a temporary price. In some such embodiments, the method 500 also includes transmitting, via a network and upon occurrence of the item-not-found-event, a price check instruction to a mobile device of a store associate. Receiving the input price of the presented item in such embodiments may include receiving the input price via the network as input into the mobile device of the store associate.

In a further embodiment, the method 500 includes receiving an input price of the presented item and then adding the item identifier read from the presented item and a data representation of the received input price to the pricing update location in association with the delivered image.

Figure 6:
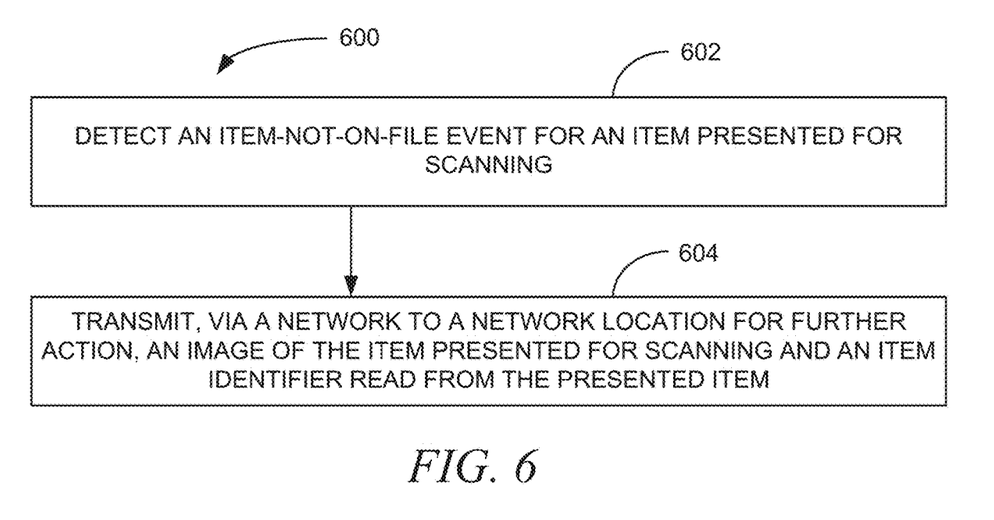
FIG. 6 is a block flow diagram of a method, according to an example embodiment.

FIG. 6 is a block flow diagram of a method 600, according to an example embodiment. The method 600 is a method that may be performed in whole or in part by one or both of a scanner and a POS terminal, among other devices.

The method 600 includes detecting 602 an item-not-on-file event for an item presented for scanning. The method 600 also includes transmitting 604, via a network to a network location for further action, an image of the item presented for scanning and an item identifier read from the presented item.

Figure 7:
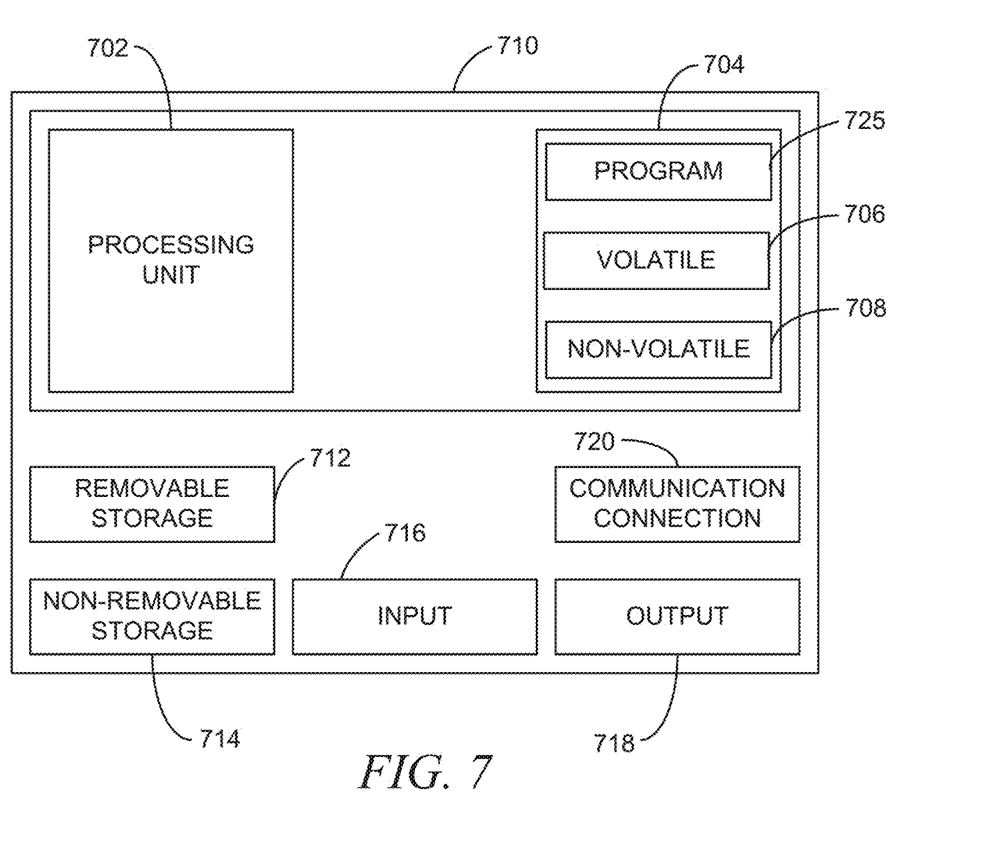
FIG. 7 is a block diagram of a computing device, according to an example embodiment.

FIG. 7 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 710, may include a processing unit 702, memory 704, removable storage 712, and non-removable storage 714. Although the example computing device is illustrated and described as computer 710, the computing device may be in different forms in different embodiments. For example, the computing device may instead be a smartphone, a tablet, smartwatch, or other computing device including the same or similar elements as illustrated and described with regard to FIG. 7. Devices such as smartphones, tablets, and smartwatches are generally collectively referred to as mobile devices. Further, although the various data storage elements are illustrated as part of the computer 710, the storage may also or alternatively include cloud-based storage accessible via a network, such as the Internet.

Returning to the computer 710, memory 704 may include volatile memory 706 and non-volatile memory 708. Computer 710 may include—or have access to a computing environment that includes a variety of computer-readable media, such as volatile memory 706 and non-volatile memory 708, removable storage 712 and non-removable storage 714. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage magnetic cassettes, magnetic tape, magnetic disk storage or other magnetic storage devices, or any other medium capable of storing computer-readable instructions.

Computer 710 may include or have access to a computing environment that includes input 716, output 718, and a communication connection 720. The input 716 may include one or more of a touchscreen, touchpad, mouse, keyboard, camera, one or more device-specific buttons, one or more sensors integrated within or coupled via wired or wireless data connections to the computer 710, and other input devices. The computer 710 may operate in a networked environment using a communication connection 720 to connect to one or more remote computers, such as database servers, web servers, and other computing device. An example remote computer may include a personal computer (PC), server, router, network PC, a peer device or other common network node, or the like. The communication connection 720 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 720 may also or alternatively include a transceiver device, such as a BLUETOOTH® device that enables the computer 710 to wirelessly receive data from and transmit data to other BLUETOOTH® devices.

Computer-readable instructions stored on a computer-readable medium are executable by the processing unit 702 of the computer 710. A hard drive (magnetic disk or solid state), CD-ROM, and RAM are some examples of articles including a non-transitory computer-readable medium. For example, various computer programs 725 or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   prompting, via one or more of a visible and audio prompt, a user to place an item within a scan-field of a product scanner;
   presenting, on a point-of-sale (POS) terminal display of a POS terminal, a live view of the scan-field to assist the user;
   capturing an image of the item presented for scanning by the product scanner of the POS terminal;
   querying a local copy of a price lookup database unsuccessfully for the presented item in the captured image;
   detecting an item-not-on-file event at the POS terminal;
   transmitting, via a network to a network storage location for further action at a later time, the image of the item presented for scanning and an item identifier read from the presented item;
   receiving an input price of the presented item;
   caching, in the local copy of the price lookup database on the POS terminal, the received input price as a temporary price with regard to the presented item for use in subsequent item-not-on-file events for the same item until an update to the price lookup database with regard to the item identifier is received, the caching of the received input price includes updating the local copy of the price lookup database with:
      the item identifier read by the product scanner from the presented item; and
      the received input price; and
      wherein the received input price is to be used in subsequent pricing lookups for the item until the update to the price lookup database with regard to the item identifier is received,
      manually checking the received input price within an immediately prior 24-hour period, and
      providing to the POS terminal the received input price in a cache.

2. The method of claim 1, wherein transmitting the image of the item presented for scanning and the item identifier for further action includes:
   transmitting, via the network, a price check instruction to a mobile device of a store associate; and
   wherein receiving the input price of the presented item includes receiving the input price via the network as input into the mobile device of the store associate.

3. The method of claim 1, further comprising: including the received input price in data transmitted over the network with the image.

4. The method of claim 3, wherein the received input price and the item identifier are included with the transmitted image as image metadata.

* * * * *